A. ESKRIDGE.
CHIROPODIST'S KNIFE.
APPLICATION FILED NOV. 5, 1909.
951,309.
Patented Mar. 8, 1910.
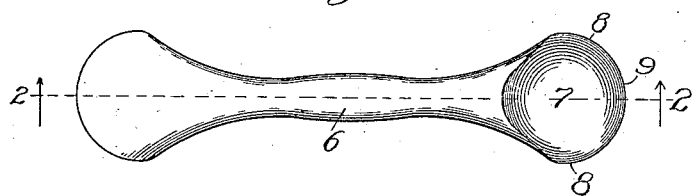
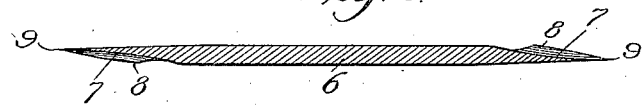
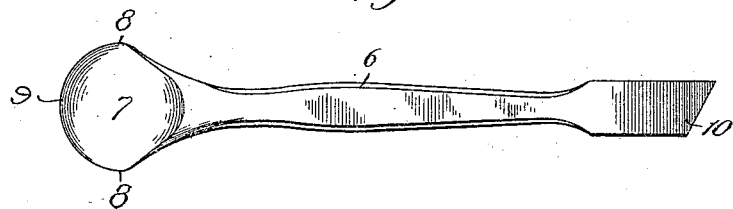
Witnesses:
Geo. C. Davison
M. A. Kiddie
Inventor:
Ammaroy Eskridge
By Lithicum, Belt & Fuller
Attys.

UNITED STATES PATENT OFFICE.

AMMAROY ESKRIDGE, OF CHICAGO, ILLINOIS.

CHIROPODIST'S KNIFE.

951,309.  Specification of Letters Patent.  Patented Mar. 8, 1910.

Application filed November 5, 1909. Serial No. 526,335.

*To all whom it may concern:*

Be it known that I, AMMAROY ESKRIDGE, a citizen of the United States, residing at Chicago, in the county of Cook and State of Illinois, have invented certain new and useful Improvements in Chiropodists' Knives, of which the following is a specification.

Chiropodists' knives have cutting portions of various forms, adapted for use under various conditions.

My invention has for its object to provide a knife especially adapted to be used for cutting away the cuticle surrounding a mal-formation such mal-formation being usually embedded thus making the operation difficult, so that unless great care is exercised the sound tissues will be cut.

The general purpose of my invention is to provide a knife of such form that while a cutting edge of suitable shape to enable an incision to be made below the surface is afforded, the knife can be used safely without danger of cutting the sound tissues.

To this end my invention consists in a knife which may be described as spherically concave or spoon shaped, that is, the knife blade is curved both longitudinally and transversely, and in the preferred form is of approximately the same diameter or width in both directions, thus affording by the upturned lateral edges protection against the danger of cutting the sound tissues, while providing an extended cutting edge enabling the knife to be used in various positions. This form of construction extends very greatly the capacity of the knife for use in various situations and renders such use perfectly safe as well as rapid.

A knife of this character may be combined in the same instrument with a blade of chisel form having a straight or beveled cutting edge.

In the accompanying drawings—Figure 1 is a plan view, and, Fig. 2 is a longitudinal-sectional view showing a spherical concave blade at both ends of the handle. Figs. 3 and 4 are similar views showing the spherical blade at one end of the handle and a chisel blade at the other; Fig. 5 is an enlarged end view of the spoon-shape knife, particularly intended to show the spherical outline and the up-turned cutting edges.

In the drawings, 6 represents the handle of the knife shown in Figs. 1 and 2, as provided at both ends with the spoon-shaped cutting member 7 reversed as to position, as is usual. The blade of this knife is approximately of circular outline. As indicated in the drawings, particularly in Fig. 5, it will be observed that this blade is curved both longitudinally and transversely, the curves being practically of the same radius. This is easily accomplished by means of a curved grinding wheel which will hollow out the concave side of the knife, while the convex surface may be readily ground by tipping the instrument upon the surface of the wheel, the curvature of the back of the blade varying in degree from the cutting edge toward the shank or handle. It will thus be observed that the effective cutting edge of the knife extends through an arc of about 180 degrees, and this may be preserved during the successive grinding of the knife although there will be developed in the regrinding points or shoulders on opposite sides of the center of the blade.

By observing Fig. 5 it will be seen that the laterally curved edges 8—8 are elevated above the front cutting edge 9. This enables the holding of the knife in various positions to present its cutting edge to the part to be cut without danger of any other portion of the edge engaging the surrounding tissue. A knife of this particular form may be combined with a chisel form of knife shown at 10, Figs. 3 and 4, or with any other desired form of knife.

Obviously, the blade of the knife may be of any desired size and instead of making the blade practically circular in form, as I have shown it, it may be more or less elongated in either direction while maintaining the double curvature.

I claim:

1. A chiropodist's knife comprising a handle terminating in a laterally-enlarged substantially semi-circular concavo-convex blade projecting at opposite sides of the handle and rigid therewith, the convex cutting edge being disposed at the outer extremity of the blade transversely of the handle, substantially as described.

2. A chiropodist's knife comprising a handle terminating in a laterally-enlarged substantially semi-circular concavo-convex blade projecting at opposite sides of the handle and rigid therewith, the convex cutting edge being disposed at the outer extremity of the blade transversely of the handle, and inclined upwardly and rearwardly from the forward extremity of the edge to the opposite transverse extremities of the blade.

AMMAROY ESKRIDGE.

Witnesses:
C. C. LINTHICUM,
MILTON MILLER.